US008255897B2

(12) United States Patent
Kawano et al.

(10) Patent No.: US 8,255,897 B2
(45) Date of Patent: *Aug. 28, 2012

(54) SOFTWARE UPDATING SYSTEM, INFORMATION PROCESSING APPARATUS AND METHOD, RECORDING MEDIUM AND PROGRAM

(75) Inventors: Shinichi Kawano, Kanagawa (JP); Yukihiko Aoki, Tokyo (JP); Shoji Araki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1136 days.

This patent is subject to a terminal disclaimer.

(21) Appl. No.: 11/926,988

(22) Filed: Oct. 29, 2007

(65) Prior Publication Data
US 2008/0263539 A1 Oct. 23, 2008

Related U.S. Application Data

(63) Continuation of application No. 10/671,471, filed on Sep. 29, 2003, now Pat. No. 7,316,013.

(30) Foreign Application Priority Data

Oct. 31, 2002 (JP) ................................. 2002-319128

(51) Int. Cl.
*G06F 9/44* (2006.01)
*G06F 9/445* (2006.01)
(52) U.S. Cl. ........................................ 717/171; 717/176
(58) Field of Classification Search .................... 717/171
See application file for complete search history.

(56) References Cited

U.S. PATENT DOCUMENTS

| 4,974,149 | A | | 11/1990 | Valenti | 709/217 |
| 5,742,829 | A | * | 4/1998 | Davis et al. | 717/178 |
| 5,974,454 | A | * | 10/1999 | Apfel et al. | 709/221 |
| 6,151,643 | A | * | 11/2000 | Cheng et al. | 710/36 |
| 6,167,567 | A | * | 12/2000 | Chiles et al. | 717/173 |
| 6,363,359 | B1 | | 3/2002 | Gronemeyer et al. | 705/28 |
| 6,502,195 | B1 | * | 12/2002 | Colvin | 726/18 |

(Continued)

FOREIGN PATENT DOCUMENTS

JP 10-21059 1/1998

(Continued)

OTHER PUBLICATIONS

Fairley, "Recent Advances in Software Estimation Techniques", @1992 ACM, retrieved from <http://delivery.acm.org/10.1145/150000/143155/p382-fai rley.pdf?ip=151.207.246.4&acc=ACTIVE$20SERVICE&CFID=99856099&CFTOKEN=38316788&_acm_=1335658904_54fc4384be6623088649c01c0cba6966>, pp. 382-391.*

*Primary Examiner* — Don Wong
*Assistant Examiner* — Marina Lee
(74) *Attorney, Agent, or Firm* — Oblon, Spivak, McClelland, Maier & Neustadt, L.L.P.

(57) ABSTRACT

It is made possible to update software appropriately. When additional software is installed, update management data for the additional software is generated. When the update management data for the additional software is attached to the additional software in advance, that data is used. If the update management data is not attached, cycles for confirming the presence of updates and the like are determined based on the nature of the software, and the update management data is thus generated. Then, the generated update management data is set in an update management table. The presence of software updates is checked for based on the cycles for confirming the presence of updates in the update management table.

9 Claims, 19 Drawing Sheets

U.S. PATENT DOCUMENTS

| | | | |
|---|---|---|---|
| 6,615,405 B1* | 9/2003 | Goldman et al. | 717/174 |
| 6,795,925 B2* | 9/2004 | Colvin | 726/30 |
| 6,944,858 B2* | 9/2005 | Luu | 717/174 |
| 7,086,050 B2* | 8/2006 | Barton et al. | 717/173 |
| 7,140,042 B2* | 11/2006 | Verma | 726/26 |
| 7,143,406 B2 | 11/2006 | Kenyon et al. | 717/173 |
| 7,206,384 B2* | 4/2007 | Beyda | 379/9.01 |
| 7,316,013 B2* | 1/2008 | Kawano et al. | 717/168 |
| 7,376,621 B1* | 5/2008 | Ling | 705/41 |
| 7,389,504 B2* | 6/2008 | Kawano et al. | 717/171 |
| 2002/0100035 A1* | 7/2002 | Kenyon et al. | 717/168 |
| 2003/0226138 A1* | 12/2003 | Luu | 717/175 |
| 2004/0019565 A1* | 1/2004 | Goringe et al. | 705/59 |
| 2004/0044999 A1* | 3/2004 | Gibson | 717/178 |
| 2004/0057558 A1* | 3/2004 | Beyda | 379/9.01 |
| 2004/0088695 A1* | 5/2004 | Kawano et al. | 717/171 |
| 2004/0088696 A1 | 5/2004 | Kawano et al. | |
| 2005/0028153 A1* | 2/2005 | Anderson | 717/168 |
| 2006/0206430 A1* | 9/2006 | Murata et al. | 705/51 |
| 2008/0201702 A1* | 8/2008 | Bunn | 717/171 |
| 2008/0263539 A1* | 10/2008 | Kawano et al. | 717/173 |

FOREIGN PATENT DOCUMENTS

| | | |
|---|---|---|
| JP | 2001-75786 | 3/2001 |
| JP | 2001-125773 | 5/2001 |
| JP | 2002-269272 | 9/2002 |
| JP | 2002-304363 | 10/2002 |

* cited by examiner

FIG. 3

| NAME OF SOFTWARE | CONFIRMATION CYCLE |
|---|---|
| NAME OF SOFTWARE A | EVERY DAY (10:00) |
| NAME OF SOFTWARE B | EVERY MONDAY (11:00) |
| NAME OF SOFTWARE C | ON THE 1st DAY OF EVERY MONTH (12:00) |

☑ CONFIRM ALL WHEN POWER IS TURNED ON

FIG. 4

| NAME OF SOFTWARE | SOFTWARE ID | VERSION NUMBER | CONFIRMATION CYCLE | URL OF UPDATE DATA SUPPLYING SERVER |
|---|---|---|---|---|
| NAME OF SOFTWARE A | XXXXX | XX | EVERY DAY (10:00) | XXXX |
| NAME OF SOFTWARE B | XXXXX | XX | EVERY MONDAY (11:00) | XXXX |
| NAME OF SOFTWARE C | XXXXX | XX | ON THE 1st DAY OF EVERY MONTH (12:00) | XXXX |

FIG. 11

PLEASE INPUT USER INFORMATION TO BE REGISTERED FOR THE AUTHENTICATION AGENT SERVICE

DEVICE ID : X X X X X

NAME :
ADDRESS :
PHONE :
⋮

(CONFIRM)
47B

FIG. 12

DEVICE ID : X X X X X

USER INFORMATION :

NAME : X X X X X
ADDRESS : X X X X X
PHONE : X X X X X
⋮

(REGISTER)
47C

FIG. 16

| NAME OF SOFTWARE | SOFTWARE ID | VERSION NUMBER | CONFIRMATION CYCLE | URL OF UPDATE DATA SUPPLYING SERVER |
|---|---|---|---|---|
| NAME OF SOFTWARE A | XXXXX | XX | EVERY DAY (10:00) | XXXX |
| NAME OF SOFTWARE B | XXXXX | XX | EVERY MONDAY (11:00) | XXXX |
| NAME OF SOFTWARE C | XXXXX | XX | ON THE 1st DAY OF EVERY MONTH (12:00) | XXXX |
| NAME OF SOFTWARE D | XXXXX | XX | EVERY DAY (14:00) | XXXX |

FIG. 17

| NAME OF SOFTWARE | CONFIRMATION CYCLE |
|---|---|
| NAME OF SOFTWARE A | EVERY DAY (10:00) |
| NAME OF SOFTWARE B | EVERY MONDAY (11:00) |
| NAME OF SOFTWARE C | ON THE 1st DAY OF EVERY MONTH (12:00) |
| NAME OF SOFTWARE D | EVERY DAY (14:00) |

☑ CONFIRM ALL WHEN POWER IS TURNED ON

SOFTWARE UPDATING SYSTEM, INFORMATION PROCESSING APPARATUS AND METHOD, RECORDING MEDIUM AND PROGRAM

CROSS REFERENCE TO RELATED APPLICATIONS

The present continuation application claims the benefit of priority under 37 U.S.C. §120 to application Ser. No. 10/671,471 (now U.S. Pat. No. 7,316,013), filed on Sep. 29, 2003, and under 35 U.S.C. §119 from Japanese Priority application No. 2002-319128, filed on Oct. 31, 2002, the entire contents of both are incorporated herein by reference.

BACKGROUND OF THE INVENTION

1. Field of the Invention

The present invention relates to a software updating system, an information processing apparatus and method, a recording medium as well as a program, and, more specifically, to a software updating system, an information processing apparatus and method, a recording medium as well as a program that make it possible to appropriately supply data that is necessary for updating software.

2. Description of the Related Art

There exists a service in which when software installed in a client device is updated (for example, when a newer version is developed), the developer of the software sends a notification via a network, and provides, via a network, the client device with update data for updating the software in response to a request that is made based on that notification (see, for example, patent document 1).

[Patent Document 1]
Japanese Application Publication 2002-269272.

SUMMARY OF THE INVENTION

However, there is a problem where, because, ordinarily, multiple software programs developed by a plurality of software developers are installed to client devices, if update data is not supplied as described above with respect to the software developed by some of those developers, client devices are unable to update those software programs appropriately.

The present invention addresses this issue, and seeks to allow the appropriate updating of software that a client device has.

A software updating system related to an embodiment of the present invention includes an electronic device and an update data supplying apparatus. The electronic device is equipped with: acquisition means for acquiring update management data indicating the timing for confirming the presence of updates for installed software; storage means for storing the update management data acquired by the acquisition means; judging means for judging based on the update management data whether or not there exists, among the installed software, software for which it is necessary that the presence of updates be confirmed; detection means for detecting an update data supplying apparatus to which an inquiry is to be made on the presence of updates for the software for which the judging means has judged a confirmation to be necessary; inquiring means for making an inquiry on the presence of software updates to the update data supplying apparatus detected by the detection means; and execution means for executing a process based on update confirmation information supplied from the update data supplying apparatus in response to the inquiry by the inquiring means. The update data supplying apparatus is equipped with: confirmation means for confirming the presence or absence of updates for the software regarding which there was an inquiry on the presence of updates by the inquiring means of the electronic device; and supplying means for supplying the update confirmation information to the electronic device in accordance with a confirmation result by the confirmation means.

The update confirmation information may be update data for updating the software, or it may be information indicating the presence or absence of updates.

The update management data is attached to the installed software, and the acquisition means of the electronic device is capable of acquiring the attached update management data from the installed software.

The acquisition means of the electronic device is also capable of acquiring update management data from the software developer of the installed software.

In the software updating system related to the present invention described above, on the electronic device's end, the update management data indicating the timing for confirming the presence of updates for the installed software is acquired, the acquired update management data is stored, it is judged based on the update management data whether, among the installed software, there exists software for which a confirmation on the presence of updates is necessary, the update data supplying apparatus to which an inquiry is to be made on the presence of updates for the software for which it is judged that a confirmation is necessary is detected, an inquiry is made to the detected update data supplying apparatus on the presence of software updates, and a process based on the update confirmation information supplied from the update data supplying apparatus in response to the inquiry is executed. On the update data supplying apparatus's end, the presence or absence of updates for the software regarding which an inquiry on the presence of updates was made is confirmed, and update confirmation information in accordance with the confirmation result is supplied to the electronic device.

An information processing apparatus related to an embodiment of the present invention is equipped with: acquisition means for acquiring update management data indicating the timing for confirming the presence of updates for installed software; storage means for storing the update management data acquired by the acquisition means; judging means for judging based on the update management data whether or not there exists, among the installed software, software for which it is necessary that the presence of updates be confirmed; detection means for detecting an update data supplying apparatus to which an inquiry is to be made on the presence of updates for the software for which the judging means has judged a confirmation to be necessary; inquiring means for making an inquiry on the presence of software updates to the update data supplying apparatus detected by the detection means; and execution means for executing a process based on update confirmation information supplied from the update data supplying apparatus in response to the inquiry by the inquiring means.

An information processing method related to an embodiment of the present invention includes: an acquisition step for acquiring update management data indicating the timing for confirming the presence of updates for installed software; a storing step for storing the update management data acquired in the acquisition step; a judging step for judging based on the update management data whether, among the installed software, there exists software for which the presence of updates needs to be confirmed; a detection step for detecting an update data supplying apparatus to which an inquiry is to be made on the presence of updates for the software for which a confirmation is judged to be necessary in the judging step; inquiring step for making an inquiry on software updates to the update data supplying apparatus detected in the detection step; and an execution step for executing a process based on update confirmation information supplied from the update data supplying apparatus in response to the inquiry made in the inquiring step.

A program in a recording medium related to an embodiment of the present invention includes: an acquisition control step for controlling the acquisition of update management data indicating the timing for confirming the presence of updates for installed software; a storage control step for controlling the storing of the update management data acquired in the acquisition control step; a judgment control step for controlling a judgment based on the update management data as to whether there exists, among the installed software, software for which the presence of updates needs to be confirmed; a detection control step for controlling the detecting of an update data supplying apparatus to which an inquiry is to be made on the presence of updates for the software for which a confirmation is judged to be necessary in the judgment control step; an inquiry control step for controlling the making of an inquiry on the presence of software updates to the update data supplying apparatus detected in the detection control step; and an execution control step for controlling the execution of a process based on update confirmation information supplied from the update data supplying apparatus in response to the inquiry made in the inquiry control step.

A program related to an embodiment of the present invention makes a computer execute a process including: an acquisition control step for controlling the acquisition of update management data indicating the timing for confirming the presence of updates for installed software; a storage control step for controlling the storing of the update management data acquired in the acquisition control step; a judgment control step for controlling a judgment based on the update management data as to whether there exists, among the installed software, software for which the presence of updates needs to be confirmed; a detection control step for controlling the detecting of an update data supplying apparatus to which an inquiry is to be made on the presence of updates for the software for which a confirmation is judged to be necessary in the judgment control step; an inquiry control step for controlling the making of an inquiry on the presence of software updates to the update data supplying apparatus detected in the detection control step; and an execution control step for controlling the execution of a process based on update confirmation information supplied from the update data supplying apparatus in response to the inquiry made in the inquiry control step.

In embodiments of the information processing apparatus and method as well as the program related to the present invention, update management data indicating the timing for confirming the presence of updates for the installed software is acquired, the acquired update management data is stored, it is judged based on the update management data whether, among the installed software, there exists software for which the presence of updates needs to be confirmed, an update data supplying apparatus to which an inquiry is to be made on the presence of updates for the software for which it is judged that a confirmation is necessary is detected, an inquiry is made to the detected update data supplying apparatus on the presence of software updates, and a process based on update confirmation information supplied from the update data supplying apparatus in response to the inquiry is executed.

According to the present invention, it is possible to update software in a desirable manner.

BRIEF DESCRIPTION OF THE DRAWINGS

FIG. 3 is a diagram showing an example of a display showing the contents of an update management table;

FIG. 4 is a diagram showing an update management table;

FIG. 11 is a diagram showing an example of an input form for user information for authentication;

FIG. 12 is a diagram showing an example of a confirmation display for user information for authentication;

FIG. 16 is a diagram showing an example display showing the contents of another update management table;

FIG. 17 is a diagram showing the other update management table;

DETAILED DESCRIPTION OF THE PREFERRED EMBODIMENTS

Figure 1:
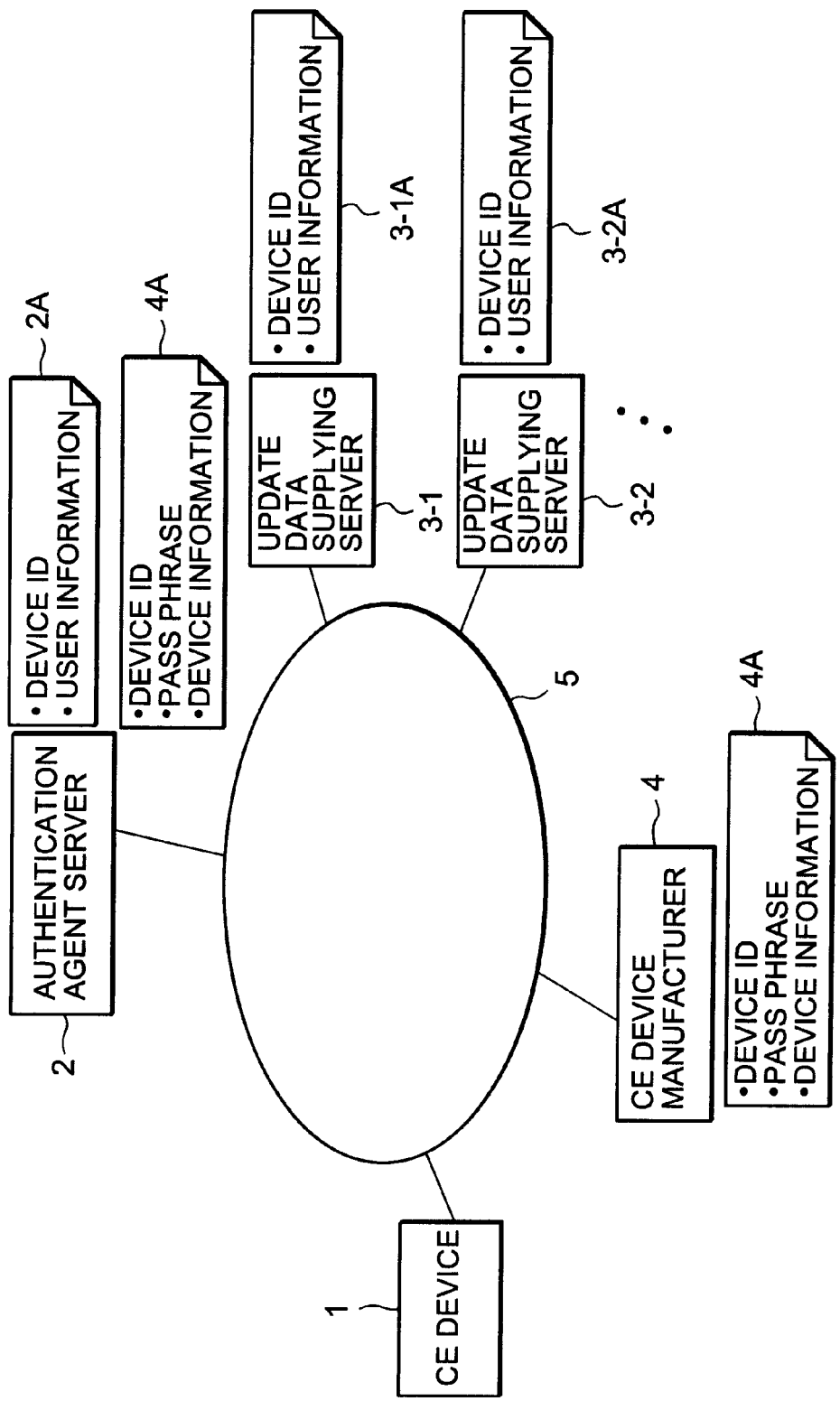
FIG. 1 is a diagram showing a configuration example of a software updating system to which the present invention is applied.

FIG. 1 shows a configuration example of a software updating system to which the present invention is applied. CE (consumer electronics) device 1 through CE device manufacturer 4 are connected to a network 5, which includes the Internet.

The CE device 1 includes household appliances such as personal computers, mobile information terminal apparatuses, television receivers, audio players, video players, car navigation apparatuses, microwave ovens, refrigerators, washing machines and the like, and has network functions for connecting to the network 5.

The CE device 1 has installed thereto various software for which distinct software developers supply update data, and performs various functions using such software.

For each of the installed software programs, the CE device 1 makes an inquiry to an update data supplying server 3 on the presence of updates therefor in a predetermined timing, and receives update data and the like as needed. In so doing, the CE device 1 needs to be authenticated by an authentication agent server 2 based on predetermined authentication information such as a device ID or the like. In other words, unless authenticated by the authentication agent server 2, the CE device 1 cannot use the update data supplying service provided by the update data supplying server 3.

The authentication agent server 2, in place of the update data supplying server 3, authenticates the CE device 1 requesting to use the update data supplying service.

The plurality of update data supplying servers 3-1, 3-2 and so on (unless it is necessary to identify the update data supplying servers individually, they will be referred to as update data supplying servers 3 for simplicity) supply, for example, update data for updating software to the CE device 1 in response to an inquiry if the CE device 1 is authenticated by the authentication agent server 2.

The CE device manufacturer 4 manufactures the CE device 1 during which it stores in the CE device 1 an update management table (described later) indicating inquiry cycles for making inquiries on updates for the installed software, authentication information, and the like.

It is to be noted that, hereinafter, for purposes of brevity, the transmission and reception of data, information or the like performed via, for example, the network 5 will be described simply as transmission/reception, abbreviating mention of "via the network 5."

An outline of the update data supplying service will be described with reference to the flowchart in FIG. 2.

In step S1, the CE device 1 judges whether or not it is necessary to confirm the presence of updates for all of the installed software, which in this example would be the software programs that come bundled with the CE device 1.

In this example, as shown in FIG. 3, if a user has checked a checkbox that is displayed on a display section 47 (FIG. 5) of the CE device 1 and which indicates all software programs are to have software updates therefor confirmed when the power is turned on, when the power of the CE device 1 is turned on, it is judged that all of the software needs to have the presence of update data confirmed. In addition, besides the example of FIG. 3, it may be made possible to set a predetermined time, for example, so that it is judged necessary to confirm the presence of updates for all software when it is that time. A drawing illustrating this example, however, is omitted.

Referring back to FIG. 2, if, in step S1, it is judged that confirmation for all software is unnecessary, the process proceeds to step S2 where the CE device 1 references an update management table (FIG. 4) stored therein, and judges whether there exists software for which the presence of updates needs to be confirmed. If it is judged that such software does exist, the process proceeds to step S3.

In the example shown in FIG. 4, the names, IDs, version numbers, cycles for confirming the presence of software updates, and the contact information for making inquiries on software updates (URLs of the update data supplying servers 3) for the bundled software are included in the update management table. Hereinafter, such data will be referred to as update management data.

In the example shown in FIG. 4, every day, at the point it is determined that 10:00 has passed (for example, when the built-in timer is indicating a time later than 10:00), because the presence of updates for software A needs to be confirmed, in step S2, a positive judgment is made. Similarly, every Monday, at the point it is determined that 11:00 has passed, or on the first day of every month, at the point it is determined that 12:00 has passed, because the presence of updates for software B or software C, respectively, needs to be confirmed, a positive judgment is made in step S2.

The display 47A shown in FIG. 3 is for presenting the contents of the update management table in FIG. 4 to a user.

Referring back to FIG. 2, in step S3, with respect to the software for which it is determined that the presence of updates needs to be confirmed, the URL of the update data supplying server to which an inquiry on the presence of updates is to be made is detected from the update management table by the CE device 1.

If it is judged, in step S1, that confirmation is necessary for all software, the process proceeds to step S4, and the CE device 1 detects from the update management table the URLs of all the update data supplying servers 3 set therein.

Once the URL(s) of the update data supplying server(s) 3 is/are detected in step S3 or step S4, the process proceeds to step S5, and an authentication process with regard to the CE device 1 is performed. Details of this process will be described later.

Once the CE device 1 is authenticated in step S5, in step S6, the update supplying server 3, if needed, transmits update data for updating software, or transmits information indicating the presence or absence of updates (hereinafter, such information will be referred to as update confirmation information where appropriate) to the CE device 1. The CE device 1 executes a process based on the update confirmation information from the update data supplying server 3. Details of this process, too, will be described later together with details of the process in step S5.

Such a process as described above is executed repeatedly in a predetermined timing.

Figure 5:
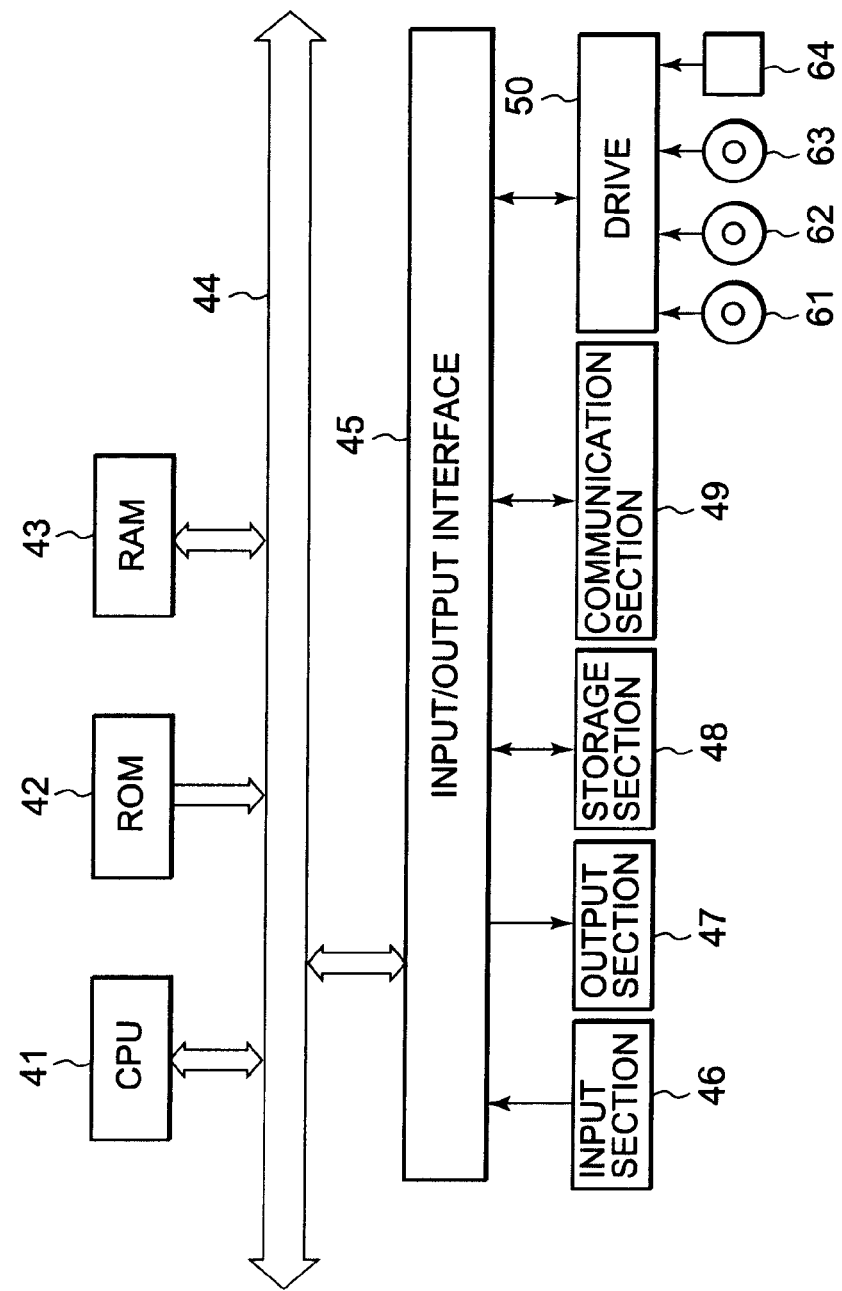
FIG. 5 is a block diagram showing a configuration example of the CE device in FIG. 1.

FIG. 5 shows a configuration example of the CE device 1.

A CPU 41 executes various processes in accordance with software loaded to a RAM 43 from a ROM 42 or a storage section 48. Data that the CPU 41 needs in executing various processes is also stored in the RAM 43 as required.

The CPU 41, the ROM 42 and the RAM 43 are interconnected via a bus 44. An input/output interface 45 is also connected to this bus 44.

An input section 46 including a keyboard, a mouse or the like, an output section 47 including a display such as a CRT (cathode ray tube), an LCD (liquid crystal display) or the like, and speakers, a storage section 48, a communication section 49 including a modem, a terminal adaptor or the like are connected to the input/output interface 45. Besides software to be run by the CPU 41, the update management table, authentication information and the like mentioned above are also stored in the storage section 48. The communication section 49 performs communication processes via the network 5.

As deemed necessary, a drive 50 is also connected to the input/output interface 45, and a magnetic disk 61, an optical disc 62, a magneto-optical disc 63, a memory card 64, or the like is loaded into the drive 50 as needed. Computer programs read from such media may be installed to the memory section 48 as required.

Figure 6:
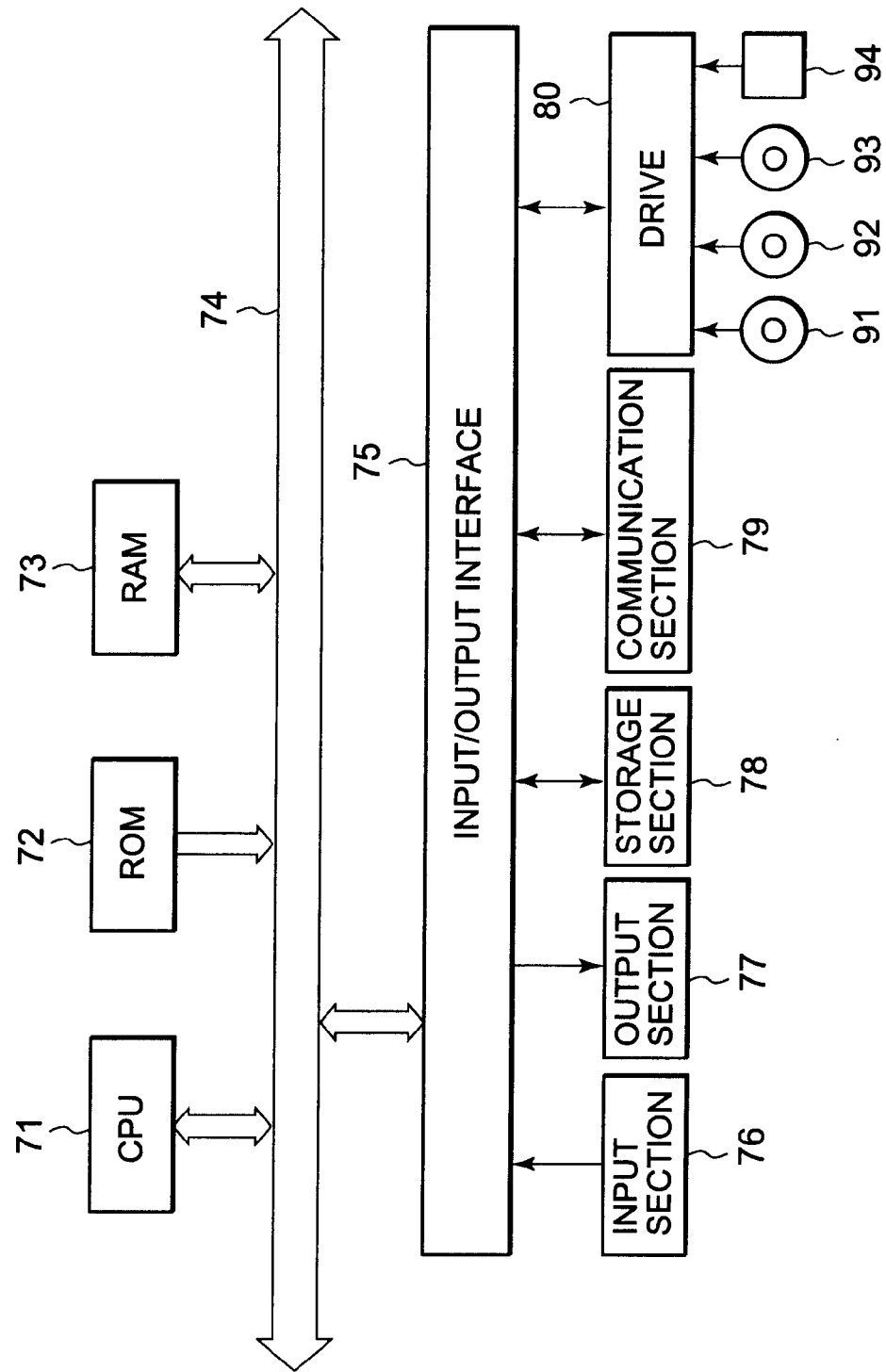
FIG. 6 is a block diagram showing a configuration example of the update data supplying server in FIG. 1.

FIG. 6 shows a configuration example of the update data supplying server 3. Since its configuration is essentially similar to the configuration of the CE device 1, a detailed description thereof will herein be omitted.

Next a process during manufacture of the CE device 1 will be described with reference to the flowchart in FIG. 7.

The authentication agent server 2, in step S21, generates a random number (hereinafter referred to as a pass phrase) which cannot be deciphered by the user and a device ID for the CE device 1. In step S22, the authentication agent server 2 generates and stores a challenge public key and a challenge secret key.

In step S23, the authentication agent server 2 transmits the device ID, the pass phrase and the challenge public key to the CE device manufacturer 4.

Figure 8:
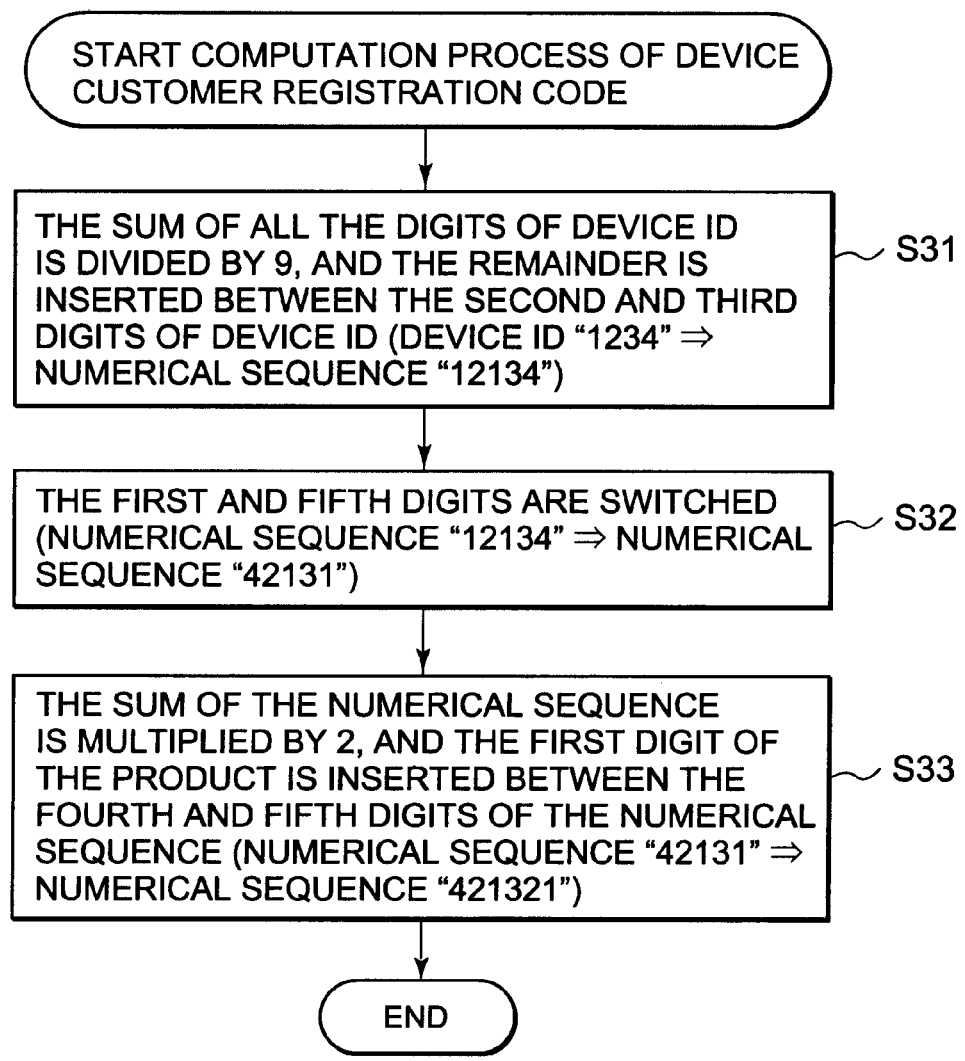
FIG. 8 is a flowchart illustrating a process for generating a device customer registration code.

Once the CE device manufacturer 4 receives the device ID, the pass phrase and the challenge public key from the authentication agent server 2 in step S11, the CE device manufacturer 4, in step S12, generates a device customer registration code from the device ID through a procedure such as the one shown in the flowchart in FIG. 8.

If the device ID is a 4-digit numerical sequence, in step S31 (FIG. 8), the sum of the numbers constituting each digit of the device ID is divided by 9, and the remainder is inserted between the second and third digits of the device ID.

For example, if the device ID is "1234," the sum of all the digits in "1234," which is 10, is divided by 9. The remainder, which is 1, is inserted between the second digit "2" and the third digit "3," and the numerical sequence "12134" is generated.

Next, in step S32, the first digit and the fifth digit of the numerical sequence generated in step S31 are switched.

For example, the first digit "1" of the numerical sequence "12134" and the fifth digit "4" are switched, and the numerical sequence "42131" is thereby generated.

In step S33, the sum of all the digits in the numerical sequence generated in step S32 is multiplied by 2, and the first digit of the product thus calculated is inserted between the fourth digit and the fifth digit of the numerical sequence generated in step S32. The numerical sequence thus obtained is taken to be the device customer registration code.

For example, the sum of all the digits in the numerical sequence "42131," which is 11, is multiplied by 2, which gives 22. The first digit of the product thus obtained, which is 2, is inserted between the fourth digit "3" of the numerical sequence "42131" and the fifth digit "1," and the device customer registration code "421321" is thus generated.

Referring back to FIG. 7, in step S13, the CE device manufacturer 4 stores the device ID, the pass phrase, and the challenge public key received in step S11 in the storage section 48 of the CE device 1. The CE device manufacturer 4 also stores the update management table (FIG. 4), in which the update management data for the software bundled with the CE device 1 is set, in the storage section 48. The CE device manufacturer 4 thus manufactures the CE device 1 storing predetermined data in the storage section 48, and packages it with a sticker or the like on which the device customer registration code generated in step S12 is printed.

The CE device manufacturer 4 may also divide the information for authentication into several parts and store them in different regions of the storage section 48. By so doing, tampering by malicious third parties can be prevented.

In step S14, the CE device manufacturer 4 stores information regarding the CE device 1 (hereinafter referred to as device information) such as the device ID, pass phrase, model code indicating the model of the CE device 1, date of manufacture and the like, and generates a device registration master 4A which is a database.

In step S15, the CE device manufacturer 4 transmits the device registration master 4A generated in step S14 to the authentication agent server 2 via the network 5. The authentication agent server 2, in step S24, stores the device registration master 4A for the CE device 1 transmitted from the CE device manufacturer 4.

In transmitting the device registration master 4A to the authentication agent server 2, the CE device manufacturer 4 encrypts the device registration master 4A by some predetermined means and transmits it to the authentication agent server 2 in order to prevent the device registration master 4A from being intercepted by third parties. In addition, it is assumed that information handled between the CE device 1, the authentication server 2 and the update data supplying server(s) 3 is also encrypted by some predetermined means as deemed appropriate.

In step S16, sales of the CE device 1 are started. For example, the CE device 1 may be sold over the network 5.

The CE device 1 is thus manufactured.

Figure 9:
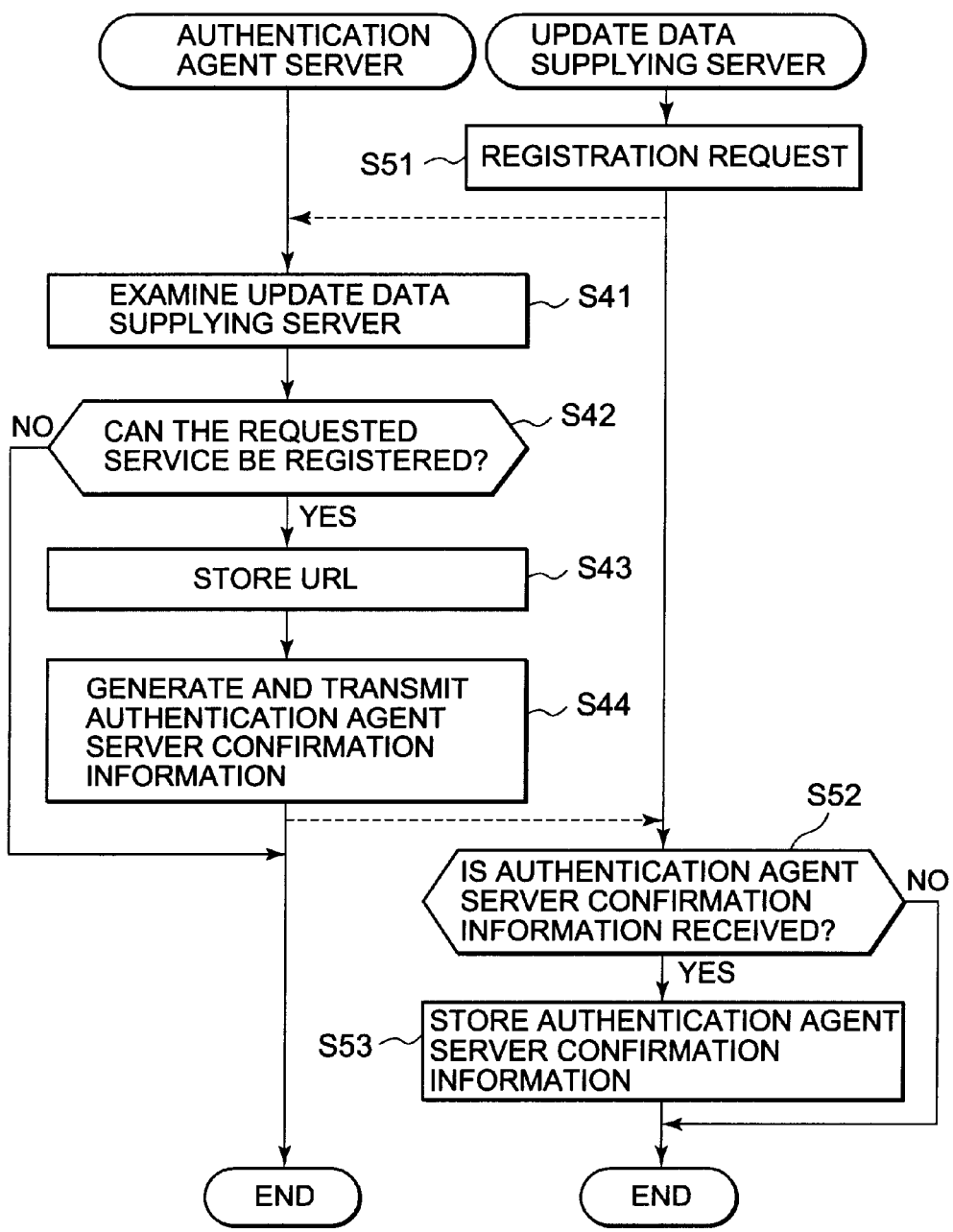
FIG. 9 is a flowchart illustrating a process for registering the update data supplying server in FIG. 1 with an authentication agent server.

Next, a process for registering the update data supplying service with the authentication agent server 2 so that with respect to the update data supplying service provided by the update data supplying server 3 (the service in which update data or the like is supplied to the CE device 1 in response to an inquiry on the presence of software updates), the authentication agent server 2 may, in place of (i.e., as a substitute for) the update data supplying server 3, authenticate the CE device 1 will be described with reference to the flowchart in FIG. 9.

In step S51, the update data supplying server 3 requests registration of substitute authentication for the update data supplying service to the authentication agent server 2.

In step S41, the authentication agent server 2 examines the update data supplying server 3, and in step S42, based on the result of the examination, the authentication agent server 2 judges whether the update data supplying service can be registered as a service for which it can perform authentication. If it is judged that the service cannot be registered, the following steps S43 and S44, which will be described later, are skipped, and the process is terminated.

On the other hand, if, in step S42, it is judged that the update data supplying service can be registered, in step S43, the authentication agent server 2 stores the URL or the like of the update data supplying server 3 which requested registration of the update data supplying service. Then, in step S44, the authentication agent server 2 generates information in which the URL or the like of the authentication agent server 2 is included (hereinafter referred to as authentication agent server confirmation information), and transmits it to the update data supplying server 3.

In step S52, the update data supplying server 3 judges whether or not the authentication agent server confirmation information has been received, and if not (in other words, if a negative judgment was made in step S42 by the authentication agent server 2, step S44 was not performed and the authentication agent server confirmation information was not transmitted), the process is terminated.

In step S52, if it is judged that the authentication agent server confirmation information has been received, the update data supplying server 3, in step S53, saves the authentication agent server confirmation information.

Thus, the update data supplying service is registered with the authentication agent server 2 as a service for which authentication by proxy (substitute authentication) can be performed.

Figure 10:
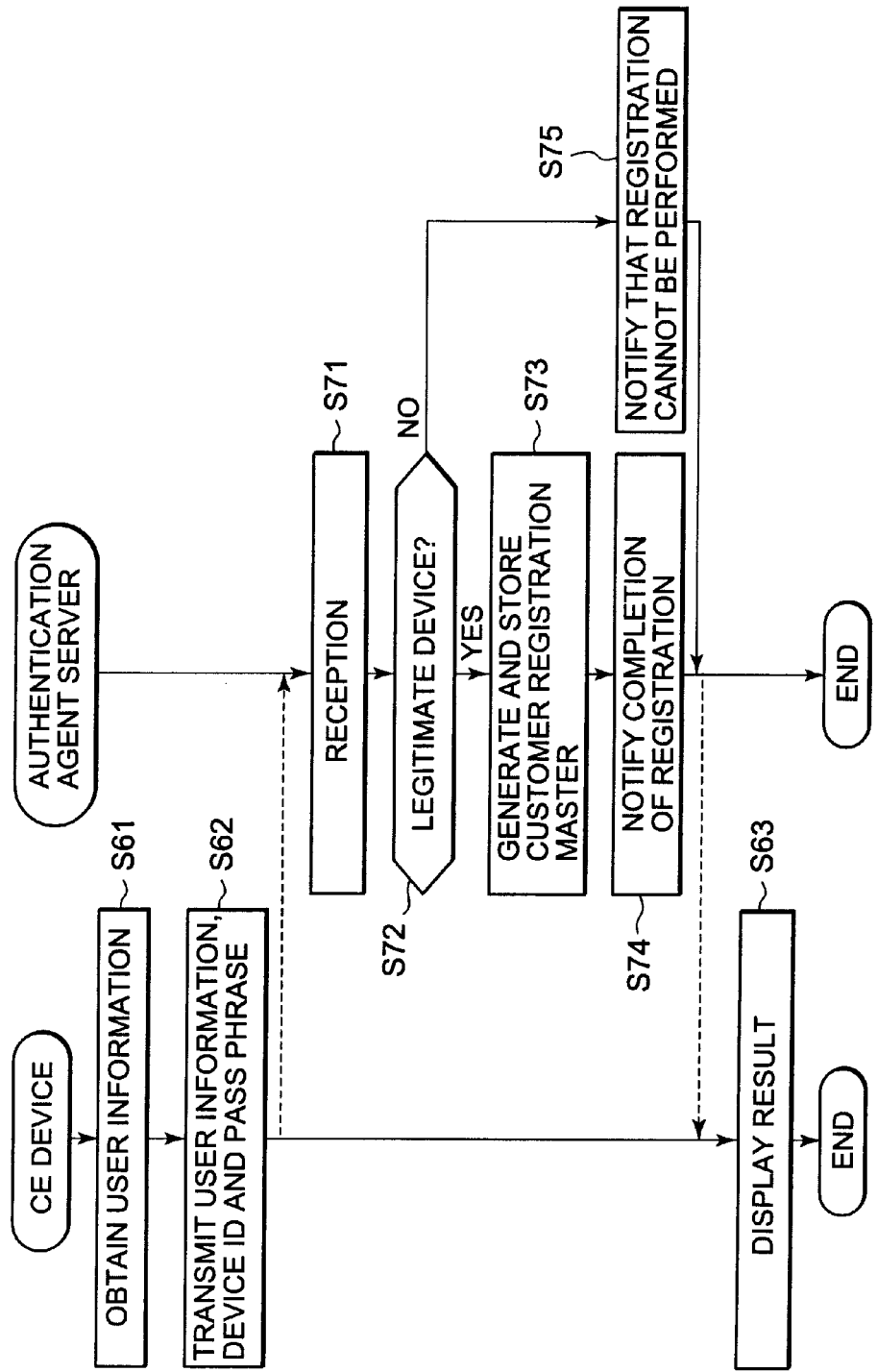
FIG. 10 is a flowchart illustrating a process for registering the CE device in FIG. 1 with an authentication agent server.

Next, a process for registering the CE device 1 with the authentication agent server 2 so that the authentication agent server 2 may authenticate the CE device 1 with respect to the update data supplying service registered in the manner described above will be described with reference to the flowchart in FIG. 10.

In step S61, when the user who has purchased the CE device 1 runs a registration application for the CE device 1 (for example, a browser, or a dedicated application for registering the CE device), the CE device 1 performs a process for obtaining user information.

For example, the CE device 1 may display on a display of the output section 47 an input form, as shown in FIG. 11, for entering user information such as the user's name, address, telephone number, as well as, for example, zip-code, date of birth, sex, type of credit card, credit card number and expiration date and the like (hereinafter referred to as user information for authentication). In the example shown in FIG. 11, because the device ID is stored in the CE device 1 (step S13 in FIG. 7), the device ID is already displayed in the input form.

After the user has entered the user information for authentication in the input form of FIG. 11, the user hits a confirm button 47B to have the information just entered displayed as in FIG. 12. When the user hits the register button 47C, the CE device 1 obtains the information entered in the input form in FIG. 11 as the user information for authentication for that user.

Referring back to FIG. 10, in step S62, the CE device 1 transmits the user information for authentication obtained in step S61 along with the device ID and pass phrase stored in the storage section 48 (step S13 in FIG. 7) to the authentication agent server 2.

In step S71, the authentication agent server 2 receives the user information for authentication, the device ID, and the pass phrase transmitted from the CE device 1. In step S72, the authentication agent server 2 checks if a device registration master 4A (step S24 in FIG. 7) in which the received device ID and pass phrase are registered exists in order to judge whether the CE device 1 is a device that is authentic (legitimate).

If, in step S72, it is judged that the CE device 1 is a legitimate device, in other words, if a device registration master 4A in which the device ID and pass phrase received in step S71 are registered exists, the authentication agent server 2, in step S73, registers the user information for authentication received in step S71 in association with the device ID registered in the device registration master 4A, and stores a customer registration master 2A thus generated. Thus, the authentication agent server 2 is able to search for device information as well as user information for identification based on the device ID.

In step S74, the authentication agent server 2 notifies the CE device 1 that registration is complete.

In step S72, if it is judged that the CE device 1 is not a legitimate device, in step S75, the CE device 1 is notified of the fact that registration could not be completed.

Once a notification message is given in step S74 or step S75, the authentication agent server 2 terminates the process.

In step S63, the CE device 1 receives a notification from the authentication agent server 2 indicating that either registration is complete or registration could not be completed, and displays a message corresponding to the notification. The process is then terminated.

Thus, the CE device 1 is (or is not) registered with the authentication agent server 2 as a device that can be authenticated.

Figure 13:
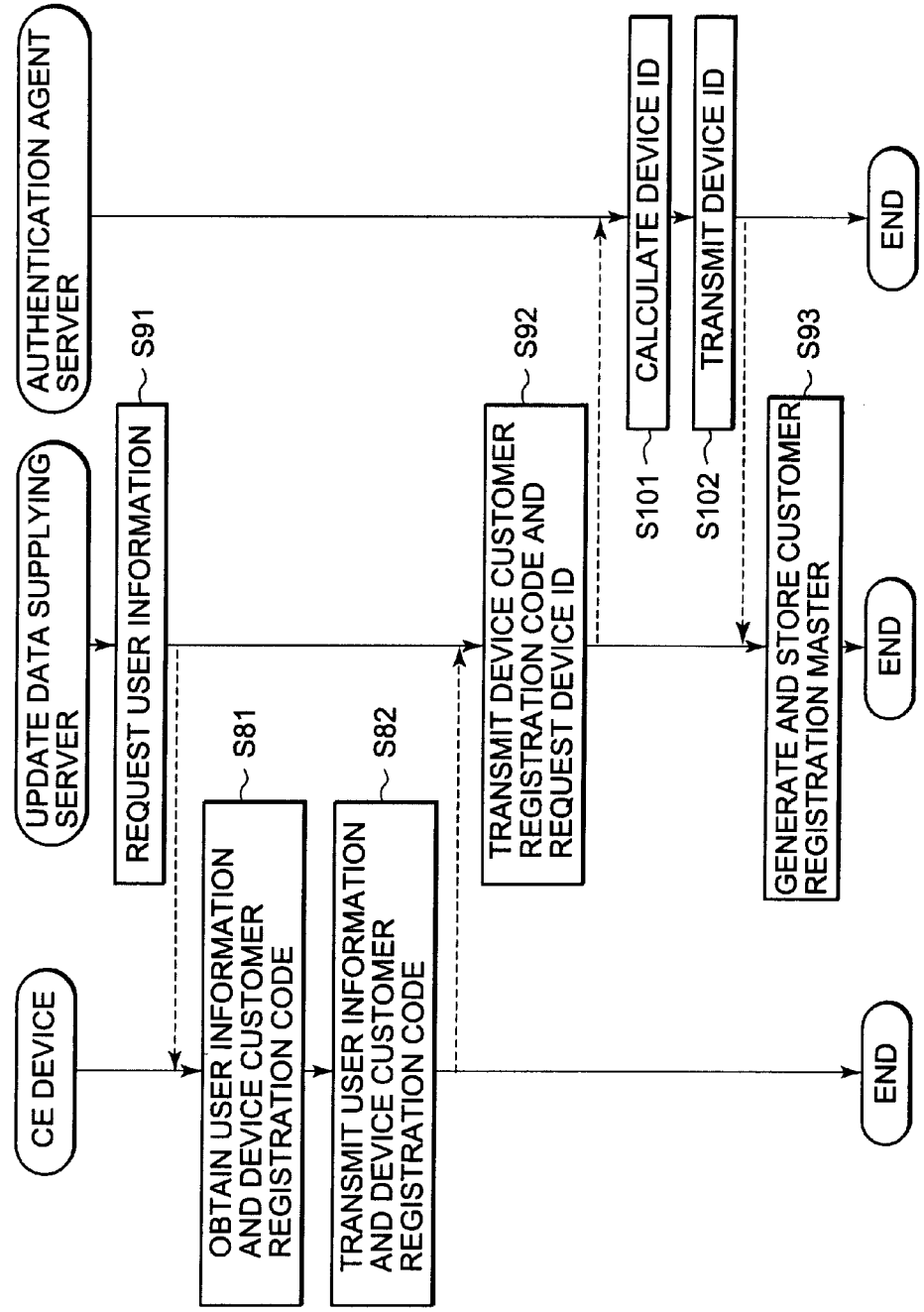
FIG. 13 is a flowchart illustrating a process for registering the CE device in FIG. 1 with the update data supplying server.

Next, a process for registering the CE device 1 with the update data supplying server 3 so that the CE device 1 may use the update data supplying service will be described with reference to the flowchart in FIG. 13.

In step S91, the update data supplying server 3 makes a request to the CE device 1 for user information for service registration.

In step S81, the CE device 1 displays on the output section 47 an input form for entering a device customer registration code in order to obtain the device customer registration code, and displays an input form for entering user information for service registration in order to obtain the user information for service registration. In step S82, the obtained user information and device customer registration code is transmitted to the update data supplying server 3.

In step S92, the update data supplying server 3 transmits to the authentication agent server 2 the device customer registration code transmitted from the CE device 1, and requests that the device ID of the CE device 1 be supplied.

In step S101, the authentication computes the device ID from the device customer registration code transmitted from the update data supplying server 3. Since the device customer registration code is derived through a computation based on the device ID as described with reference to the flowchart in FIG. 8, by performing an inverse computation on the device customer registration code, the device ID can be computed.

In step S102, the authentication agent server 2 transmits the computed device ID to the update data supplying server 3.

In step S93, the update data supplying server 3 registers the user information from the CE device 1 in association with the device ID from the authentication agent server 2, and stores a customer registration master 3A thus generated. Thus, the update data supplying server 3 is capable of searching for user information based on the device ID.

Thus, the CE device 1 is registered with the update data supplying server 3.

Next, operations of the CE device 1, the authentication agent server 2, and the update data supplying server 3 when the CE device 1 uses the update data supplying service will be described with reference to the flowchart in FIG. 14. In other words, steps S151 through S157 by the CE device 1, steps S171 through S177 by the update data supplying server 3, and steps S191 through S197 by the authentication agent server 2 in FIG. 14 correspond to the process in step S5 in FIG. 2, and steps S158 and S159 by the CE device 1, and step S178 by the update data supplying server 3 correspond to the process in step S6 in FIG. 2.

Figure 2:
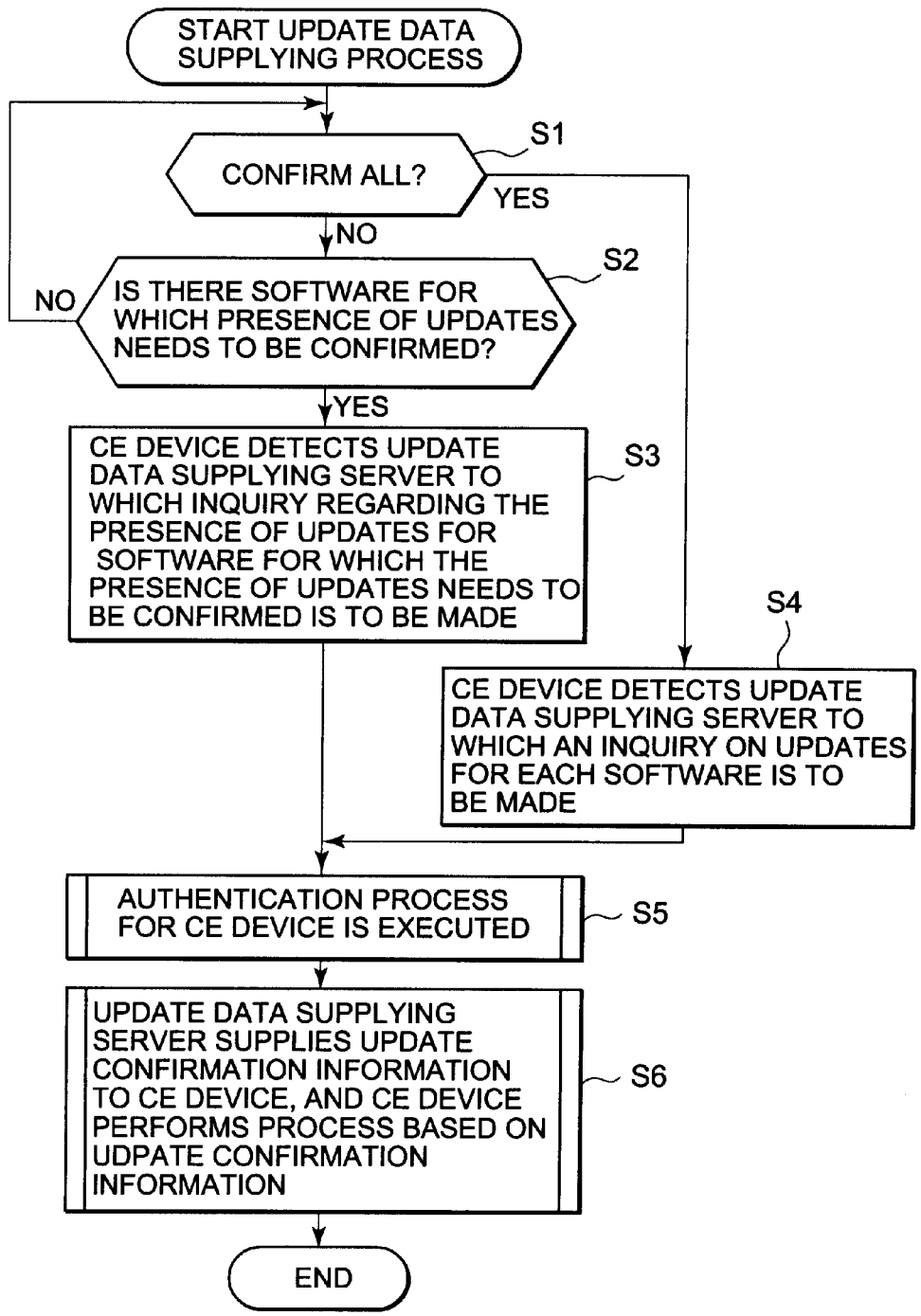
FIG. 2 is a flowchart illustrating an outline of an update data supplying service.

When the update data supplying server 3 to which an inquiry on the presence of software updates is to be made is detected in step S3 or step S4 in FIG. 2, the CE device 1, in step S151, transmits to the update data supplying server 3 the ID and version number, for example, of the software for which the presence of updates is to be confirmed, and makes an inquiry on the presence of updates for that software (requests the use of the update data supplying service). In FIG. 14, although only a process of the CE device 1 with respect to a single update data supplying server 3, and a process of a single update data supplying server 3 are indicated, if a plurality of the update data supplying servers 3 are detected in step S3 or step S4, the CE device 1 performs a process similar to the process shown in FIG. 14 with respect to each of the detected update data supplying servers 3, and a process similar to the process shown in FIG. 14 is performed by each of the update data supplying servers 3.

When the use of the update data supplying service is requested by the CE device 1, the update data supplying server 3, in step S171, judges whether or not a session is established between itself and the CE device 1. If it is judged that a session is established with the CE device 1, steps S172 through S177, which will be described later, are skipped, and the process proceeds to step S178.

On the other hand, if in step S171, it is judged that a session is not established, the update data supplying server 3, in step S172, transmits the authentication agent server confirmation information stored in step S53 in FIG. 9 to the CE device 1.

In step S152, the CE device 1 judges whether or not the authentication agent server confirmation information has been received from the update data supplying server 3, and if it is judged that it has not been received (in other words, if a positive judgment was made in step S171 by the update data supplying server 3, step S172 was not performed and the authentication agent server confirmation information was not transmitted), steps S153 through S157, which will be described later, are skipped and the process proceeds to step S158.

On the other hand, if, in step S152, it is judged that the authentication agent server confirmation information has been received, the CE device 1, in step S153, performs a process of confirming whether the authentication agent server 2 is the proper server using the URL included in the received authentication agent server confirmation information.

For example, the CE device 1 generates a random number (hereinafter the random number generated here will be referred to as a challenge where appropriate), and this random number (challenge) is transmitted to the site of the URL (the authentication agent server 2) embedded in the authentication agent server confirmation information.

Figure 7:
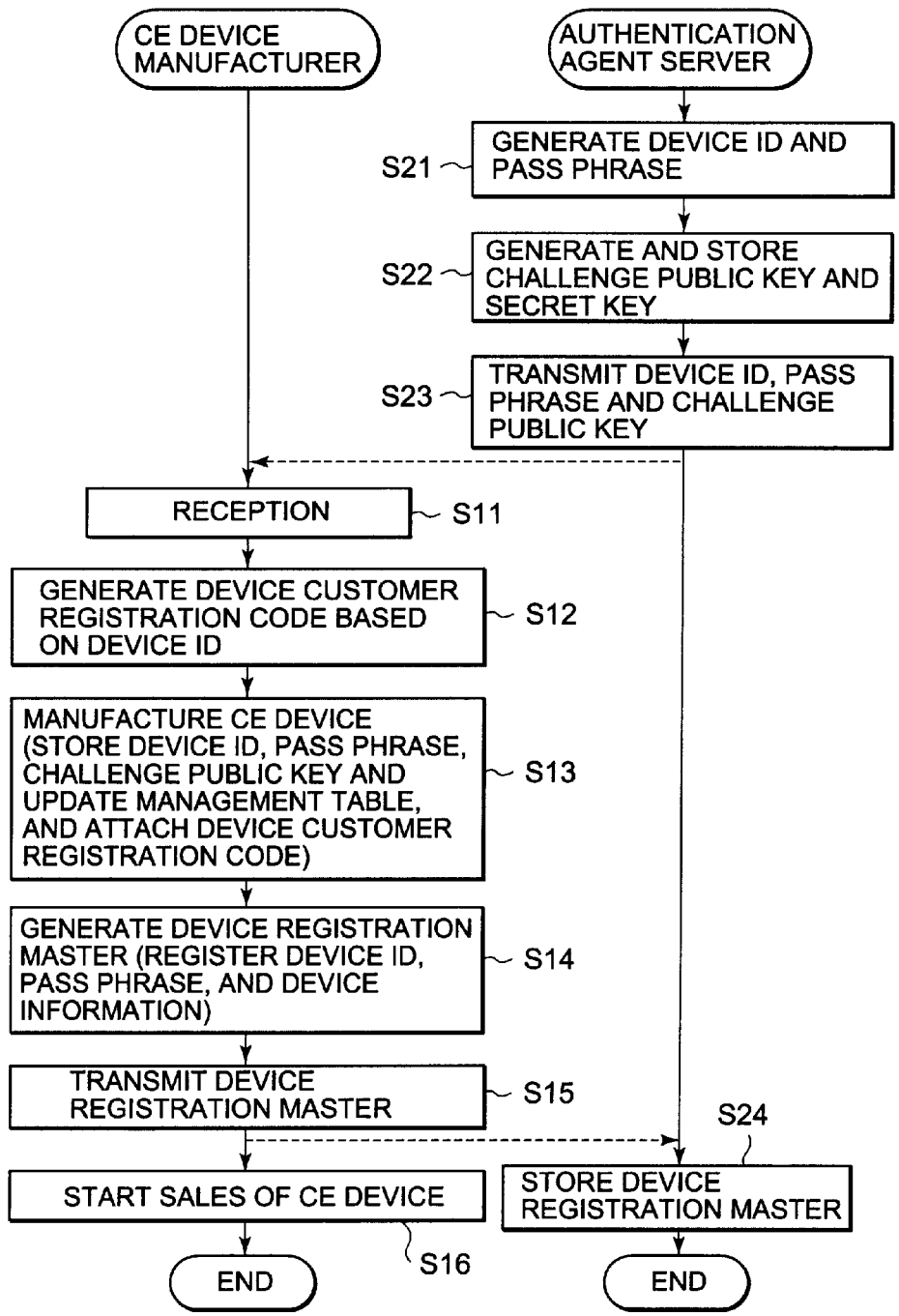
FIG. 7 is a flowchart illustrating a process during the manufacture of the CE device in FIG. 1.

The authentication agent server 2 encrypts the random number (challenge) from the CE device 1 using the challenge secret key generated in step S22 in FIG. 7, and transmits it to the CE device 1.

Using the challenge public key stored in the storage section 48 in step S13 in FIG. 7, the CE device 1 decrypts the random number (challenge) that is encrypted with the challenge secret key and is transmitted from the authentication agent server 2, and matches it against the challenge generated earlier. If both challenges do match, it is identified that the authentication agent server 2 is the proper server.

In step S154, the CE device 1, based on the confirmation result of step S153, judges whether the authentication agent server 2 is the proper server. If it is judged not to be the proper server, steps S155 through S159, which will be described later, are skipped, and the process is terminated.

On the other hand, if, in step S154, it is judged that the authentication agent server 2 is the proper server, the CE device 1, in step S155, transmits to the authentication agent server 2 the device ID and the pass phrase stored in the storage section 48 in step S13 in FIG. 7, as well as the URL of the update data supplying server 3 detected in step S3 or step S4 in FIG. 2, thus requesting authentication in order to use the update data supplying service.

After performing the process that corresponds to the authentication agent server confirmation process at the CE device 1 (step S153) in step S191, the authentication agent server 2, in step S192, judges whether or not authentication has been requested from the CE device 1. If it is judged that authentication has not been requested (if a negative judgment was made in step S154 at the CE device 1, step S155 was not performed, and authentication was not requested), steps S193 through steps S197, which will be described later, are skipped and the process is terminated.

On the other hand, if, in step S192, it is judged that authentication has been requested by the CE device 1, the authentication agent server 2, in step S193, judges whether or not the update data supplying service, which the CE device 1 is requesting to use, is registered as a service for which the authentication agent server 2 is capable of performing authentication by proxy. Specifically, since the URL(s) of the update data supplying server(s) 3 is/are stored in step S43 in FIG. 9, the authentication agent server 2 judges whether or not the same URL as the one transmitted from the CE device 1 is stored.

In step S193, if it is judged that the update data supplying service is registered, the authentication agent server 2, in step S194, checks if a device registration master 4A in which the device ID and pass phrase received in step S192 are registered exists, and thus authenticates the CE device 1 (authentication by proxy is performed).

In step S193, if it is judged that the update data supplying service is not registered, or if in step S194, the CE device 1 cannot be authenticated, steps S195 through S197, which will be described later, are skipped and the process is terminated.

Once the CE device 1 is authenticated in step S194, the authentication agent server 2, in step S195, issues a one-time ID for identifying the CE device 1 until it is invalidated in step S196, which will be described later, and transmits it to the CE device 1.

In step S156, the CE device 1 judges whether or not the one-time ID from the authentication agent server 2 has been received. If it is judged that it has not been received (in other words, if a negative judgment is made at the authentication agent server 2 in step S193 or step S194, step S195 is not performed, and the one-time ID is not transmitted), steps S157 through S159, which will be described later, are skipped, and the process is terminated.

On the other hand, if, in step S156, it is judged that the one-time ID has been received, the CE device 1, in step S157, transmits the one-time ID received in step S156 to the update data supplying server 3.

In step S173, the update data supplying server 3 judges whether or not the one-time ID from the CE device 1 has been received. If it is judged that it has not been received (in other words, if a negative judgment is made in step S156 at the CE device 1, step S157 is not performed, and the one-time ID is not transmitted), steps S174 through S178, which will be described later, are skipped, and the process is terminated.

On the other hand, if, in step S173, it is judged that the one-time ID has been received, the update data supplying server 3, in step S174, transmits the one-time ID received in step S173 to the authentication agent server 2, and requests the provision of the device information on the CE device 1.

In step S196, the authentication agent server 2 receives the one-time ID transmitted from the update data supplying server 3, and confirms whether or not the one-time ID is transmitted from the server corresponding to the URL received in step S192. The one-time ID then becomes invalid.

In step S197, the authentication agent server 2 searches the device registration master 4A of the CE device 1 for the device information (including the device ID) on the CE device 1 identified by the one-time ID received in step S196, and transmits it to the update data supplying server 3.

Once, in step S175, the update data supplying server 3 receives the device information on the CE device 1 transmitted from the authentication agent server 2, it is judged, in step S176, whether or not the CE device 1 is registered with the update data supplying server 3 as a device that can use the update data supplying service. For example, since, in step S93 in FIG. 13, the customer registration master 3A in which the device ID of the CE device 1 is registered is stored, the update data supplying server 3 judges whether or not a customer registration master 3A in which the device ID transmitted from the authentication agent server 2 is registered is stored.

In step S176, if it is judged that the CE device 1 is not registered, steps S177 and S178, which will be described later, are skipped and the process is terminated.

On the other hand, if, in step S176, it is judged that the CE device 1 is registered, the update data supplying server 3, in step S177, establishes a session with the CE device 1. While the session is continued with the CE device 1, generally, authentication of the CE device 1 is not requested to the authentication agent server 2 (in other words, a positive judgment is made in step S171, and steps S172 through S176 are skipped).

When it is judged in step S171 that a session is established, or when a session is established in step S177, the update data supplying server 3, in step S178, confirms whether or not the software regarding which an inquiry is made by the CE device 1 has been updated, and transmits to the CE device 1 the update confirmation information in accordance with the confirmation result. For example, if the software has been updated, update data for updating the software that the CE device 1 has may be transmitted to the CE device 1. In addition, information indicating the presence or absence of updates may be transmitted to the CE device 1.

When it is judged, in step S152, that the authentication agent server confirmation information has not been received (when there is a possibility that a session is already established), or if, in step S157, the one-time ID is transmitted to the authentication agent server 2, the CE device 1, in step S158, judges whether or not the update confirmation information from the update data supplying server 3 has been received. If it is judged that it has not been received (in other words, if a negative judgment is made in step S176 at the update data supplying server 3, step S178 is not performed, and the update data is not transmitted), the process is terminated.

On the other hand, if, in step S158, it is judged that the update confirmation information from the update data supplying server 3 has been received, the CE device 1, in step S159, performs a process in accordance with the received update confirmation information. For example, if the update data is received, the software is updated accordingly. Alternatively, if information indicating the presence or absence of updates is received, the CE device 1 displays information in accordance therewith on the output section 47, and performs a process in accordance with instructions from the user made with respect to the displayed information (for example, a process for obtaining update data may be performed).

Thus, the CE device 1 is able to update installed software appropriately.

In the description above, the CE device 1 makes an inquiry on the presence of updates when the update data supplying server 3 is detected in step S3 or step S4 in FIG. 2. However, the inquiry may be postponed till a predetermined time late at night during which traffic in the network 5 is lighter.

In addition, the CE device 1 may prioritize inquiries for some software on the presence of updates depending on the importance of the software. For example, if the timings for making inquiries on update data coincide between security related software and some other software, inquiries on the presence of updates for the security related software may be prioritized over those of the other software In the description above, the example was of a case where bundled software was updated. However, with respect to software that is installed later (hereinafter referred to as additional software), too, by additionally setting the update management data for the additional software in the update management table, the additional software may be updated appropriately.

Figure 15:
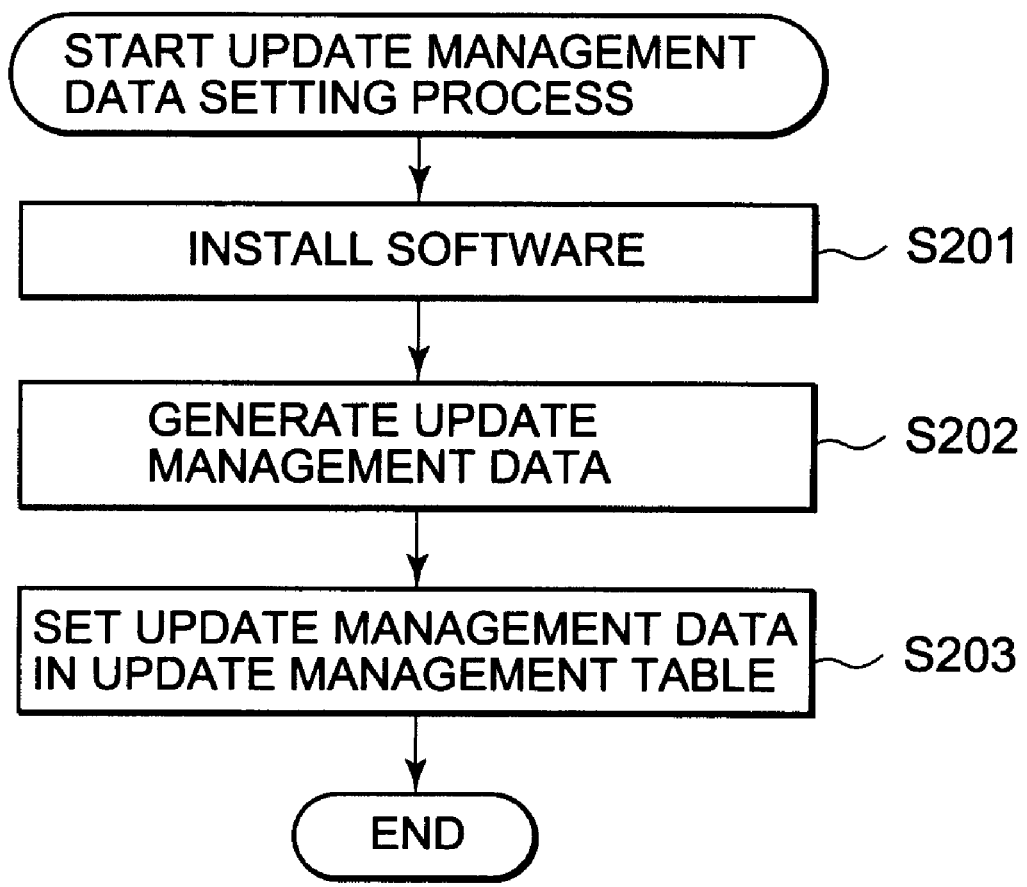
FIG. 15 is a flowchart showing a procedure for setting update management data in an update management table.

FIG. 15 shows a procedure for additionally setting the update management data for the additional software in the update management table. When the additional software is installed in step S201, the CE device 1, in step S202, generates the update management data for the additional software.

If the update management data for the additional software is provided along with the additional software, the data may be used. If the update management data is not provided with the additional software, cycles for confirming the presence of updates may be decided on depending on the nature of the software, and the update management data may be generated. For example, for security related software, the confirmation cycle may be made shorter. In addition, the update management data may be obtained from the developer of the additional software.

In step S203, the CE device 1 sets the generated update management data in the update management table.

FIG. 16 shows the update management data in FIG. 4 in a state where the update management data for software D is set additionally. In addition, FIG. 17 shows an example of a display 47A that displays the contents of the update management table of FIG. 16.

Figure 18:
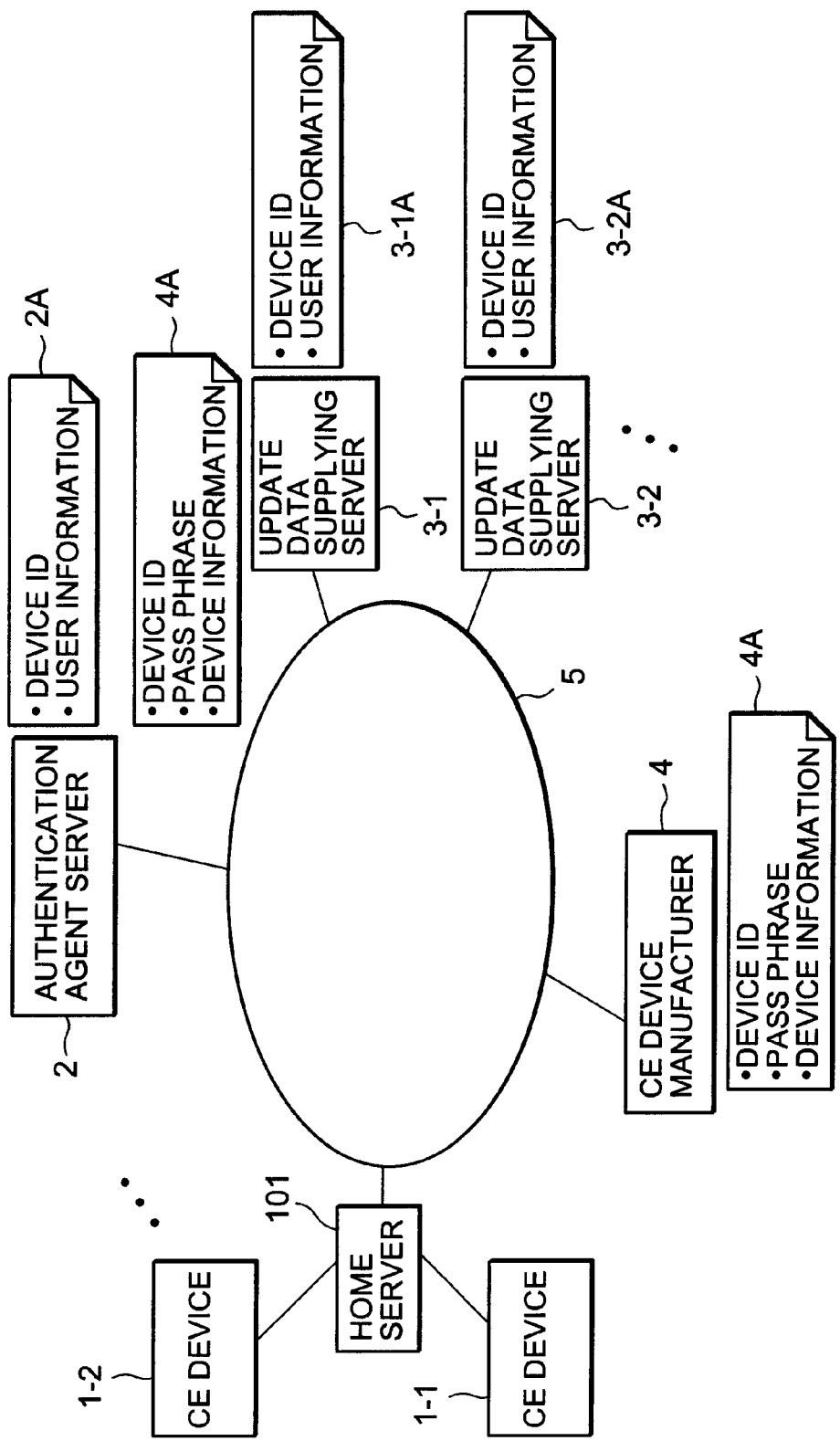
FIG. 18 is a diagram showing a configuration example of another software updating system to which the present invention is applied.

In the description above, an example was given where the CE device 1 communicates directly with the authentication agent server 2 and the update data supplying server 3 via the network 5. However, as shown in FIG. 18, communications may be performed with the authentication agent server 2 and the update data supplying server 3 via a home server 101 connected to the network 5.

In this example, in step S5 in FIG. 2, the URL of the update data supplying server 3 detected in a process corresponding to step S3 or step S4 is notified to the home server 101 from the CE device 1 connected thereto (a plurality of the CE devices 1 may also be connected). Then, in a process corresponding to step S151 in FIG. 14, the home server 101 accesses the update data supplying server 3 using the notified URL, and makes an inquiry on the presence of software updates. Then, processes corresponding to steps S152 through S158 are performed.

Figure 19:
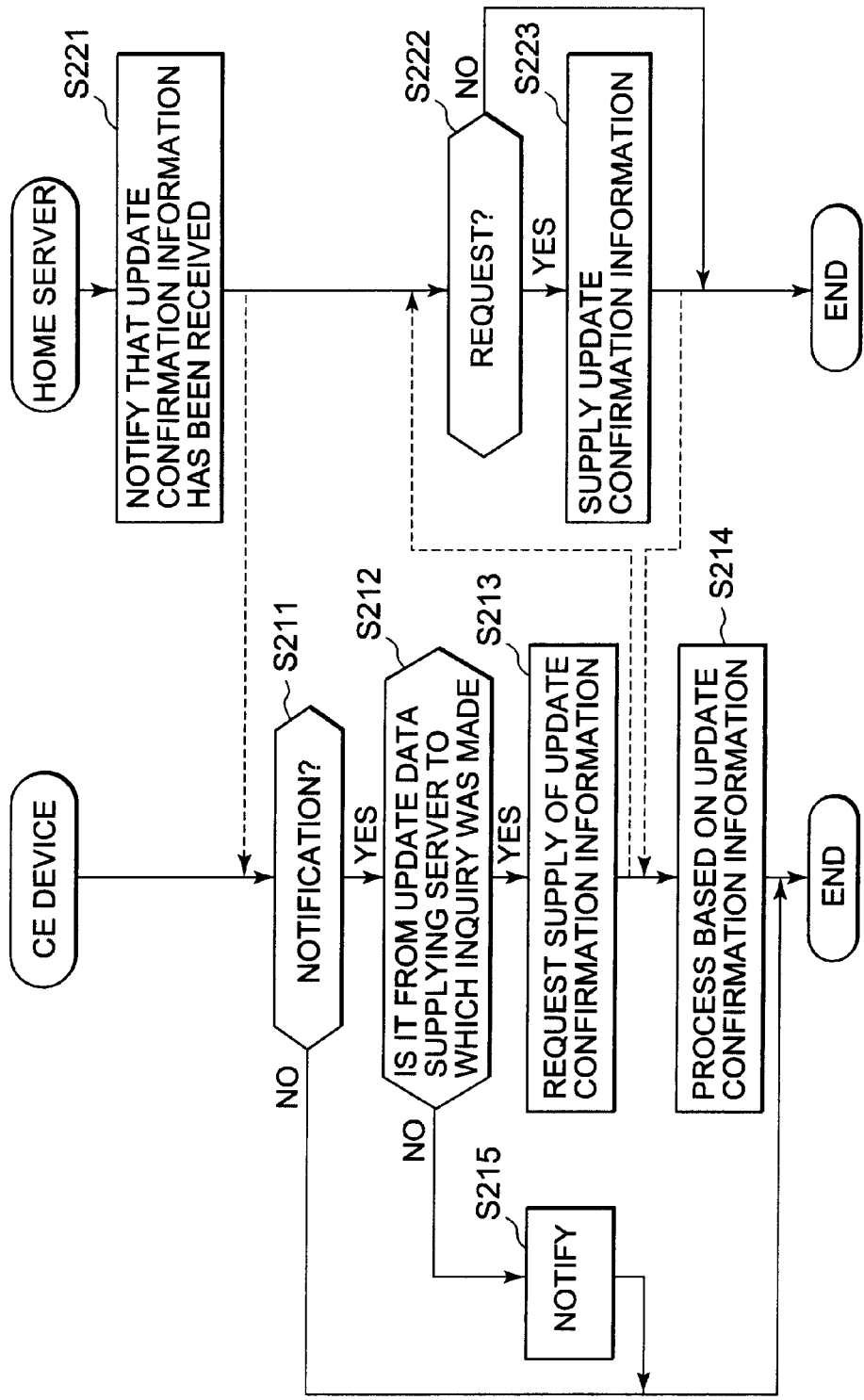
FIG. 19 is a flowchart illustrating the operation of the home server in FIG. 18.

A process corresponding to step S159 is performed in a procedure illustrated with the flowchart of FIG. 19.

When the update confirmation information supplied from the update data supplying server 3 (step S158 in FIG. 14) is received, the home server 101, in step S221, notifies all of the CE devices 1 connected thereto accordingly.

In step S211, the CE device 1 judges whether or not it has been notified that the update confirmation information has been received. In FIG. 19, for purposes of brevity, a process by the home server 101 in relation to a single CE device 1 and a process of a single CE device 1 are shown. However, in reality, the home server 101 performs a process similar to the process shown in FIG. 19 with respect to each of the connected CE devices 1, and each of the CE devices 1 also performs a process similar to the process shown in FIG. 19.

In step S211, if it is judged that it has been notified that the update confirmation information has been received, the CE device 1, in step S212, judges whether or not the update confirmation information is from the update data supplying server 3 detected in step S3 or step S4 in FIG. 2. If judged so, the process proceeds to step S213.

In step S213, the CE device 1 requests the provision of the received update confirmation information to the home server 101.

In step S222, the home server 101 judges whether or not the CE device 1 has requested the provision of the update confirmation information. If it is judged that there has been a request, the home server 101, in step S223, supplies to the CE device 1 the update confirmation information supplied from the update data supplying server 3.

In step S214, the CE device 1 receives the update confirmation information supplied from the home server 101, and performs a process based thereon.

In step S212, if it is judged that the update confirmation information is not from the update data supplying server 3 to which an inquiry on the presence of updates was made, the CE device 1, in step S215, notifies the home server 101 accordingly.

The CE device 1 terminates the process when it is judged, in step S211, that there has not been any notification that the update confirmation information from the home server 101 has been received, when a predetermined process is performed in step S214, or when a predetermined notification is made in step S215.

The home server 101 terminates the process when it is judged, in step S222, that there has been no request by the CE device 1, or when the update confirmation information is supplied to the CE device 1 in step S223.

Figure 14:
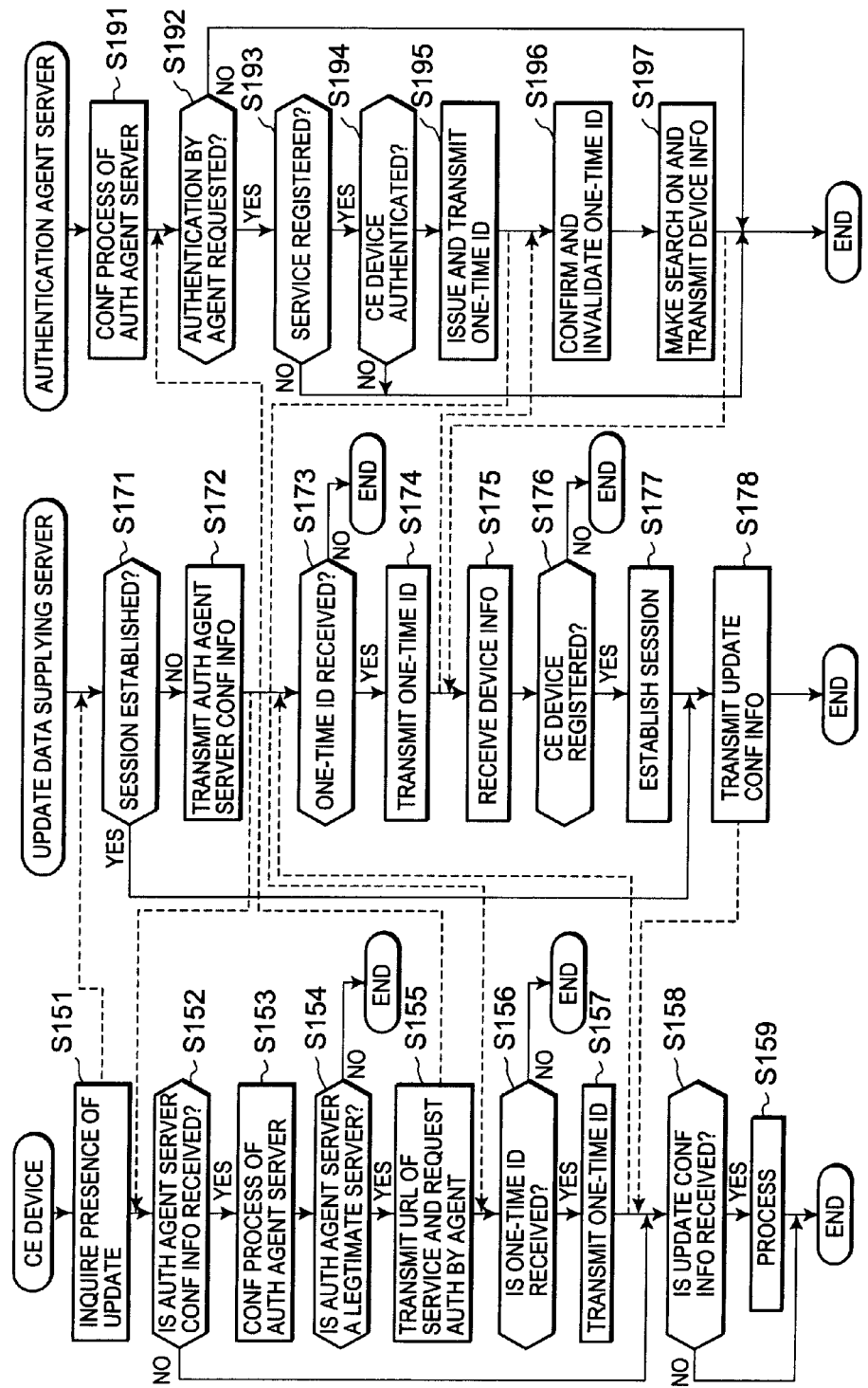
FIG. 14 is a flowchart illustrating a procedure for using an update data supplying service.

In addition, the home server 101, during a process corresponding to step S151 in FIG. 14, may also postpone making inquiries until a predetermined time late at night at which the traffic in the network 5 is not as heavy.

Figure 20:
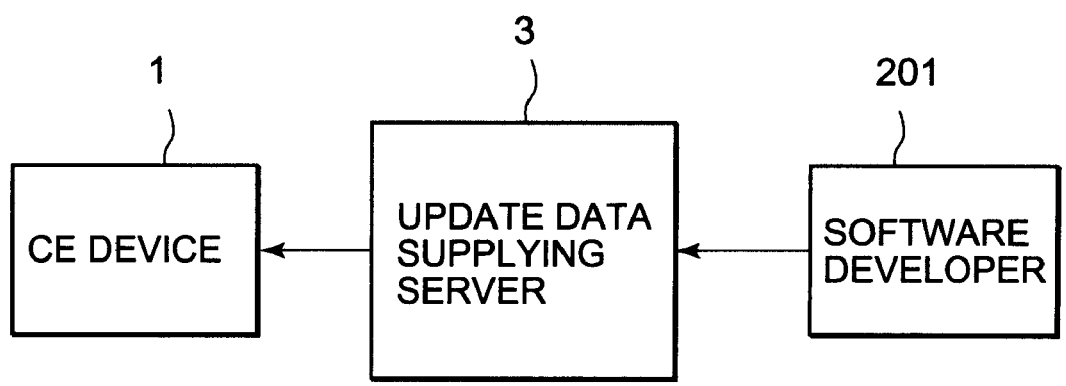
FIG. 20 is a diagram illustrating a method of supplying update data.

Further, although not mentioned in the description above, the update data supplied to the CE device 1 may also be stored in the update data supplying server 3, or, as shown in FIG. 20, it may be obtained, as deemed appropriate, from a software developer 201 via a network (such as the network 5, for example).

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A software updating system, comprising:
an update data supplying apparatus for supplying update confirmation information regarding a presence or absence of updates for predetermined software via a network;
an electronic device for executing a process in accordance with said update confirmation information supplied from said update data supplying apparatus, wherein said electronic device includes:
means for deciding and generating update management data indicating a time cycle for confirming the presence of updates for installed software, wherein the time cycle is determined based on a nature of the installed software;
storage means for storing said update management data generated by said means for deciding and generating;
judging means for judging based on said update management data whether or not, the presence of updates needs to be confirmed;
detection means for detecting said update data supplying apparatus to which an inquiry is to be made on the presence of updates for said software for which said judging means has judged a confirmation to be necessary;
inquiring means for making an inquiry on the presence of updates for said software to said update data supplying apparatus detected by said detection means; and
execution means for executing a process based on said update confirmation information supplied from said update data supplying apparatus in response to said inquiry made by said inquiring means, and
said update data supplying apparatus includes:
confirmation means for confirming the presence or absence of updates for said software regarding which there was an inquiry on the presence of updates by said inquiring means of said electronic device; and
supplying means for supplying to said electronic device said update confirmation information in accordance with a confirmation result by said confirmation means.

2. The software updating system according to claim 1, wherein said update confirmation information is one of update data for updating said software and information indicating the presence or absence of updates.

3. The software updating system according to claim 1, wherein said update management data is attached to said installed software, and
Said means for deciding and generating of said electronic device acquires said attached update management data from said installed software.

4. A software updating method, comprising:
supplying update confirmation information regarding a presence or absence of updates for predetermined software via a network with an update data supplying apparatus;
executing a process in accordance with said update confirmation information with an electronic device;
deciding and generating update management data indicating a time cycle for confirming the presence of updates for installed software, wherein the time cycle is determined based on a nature of the installed software;
storing said update management data;
judging based on said update management data whether or not, the presence of updates needs to be confirmed;
detecting said update data supplying apparatus to which an inquiry is to be made on the presence of updates for said software for which said judging has judged a confirmation to be necessary;
making an inquiry on the presence of updates for said software to said update data supplying apparatus detected by said detecting; and
executing a process based on said update confirmation information supplied from said update data supplying apparatus in response to said inquiry;
confirming the presence or absence of updates for said software regarding which there was an inquiry on the presence of updates by said inquiry; and
supplying to said electronic device said update confirmation information in accordance with a confirmation result obtained by said confirming.

5. An information processing apparatus which executes a process in accordance with update confirmation information supplied from an update data supplying apparatus that supplies via a network said update confirmation information regarding a presence or absence of updates for predetermined software, comprising:
means for deciding and for generating update management data indicating a time cycle for confirming the presence of updates for installed software, wherein the time cycle is determined based on a nature of the installed software;
storage means for storing said update management data generated by said means for deciding and generating;
judging means for judging based on said update management data whether or not, the presence of updates needs to be confirmed;
detection means for detecting said update data supplying apparatus to which an inquiry is to be made on the presence of updates for said software for which said judging means has judged a confirmation to be necessary;

inquiring means for making an inquiry on the presence of updates for said software to said update data supplying apparatus detected by said detection means; and execution means for executing a process based on said update confirmation information supplied from said update data supplying apparatus in response to said inquiry made by said inquiring means.

6. The information processing apparatus according to claim 5, wherein said update confirmation information is one of update data for updating said software and information indicating the presence or absence of updates.

7. The information processing apparatus according to claim 5, wherein said update management data is attached to said installed software, and said means for deciding and generating acquires said attached update management data from said installed software.

8. An information processing method, which executes a process in accordance with update confirmation information supplied from an update data supplying apparatus that supplies via a network said update confirmation information regarding a presence or absence of updates for predetermined software, comprising:

deciding and generating update management data indicating a timing for confirming the presence of updates for installed software, wherein the time cycle is determined based on a nature of the installed software;

storing said update management data generated by said generating;

judging based on said update management data whether or not, the presence of updates needs to be confirmed;

detecting said update data supplying apparatus to which an inquiry is to be made on the presence of updates for said software for which said judging has judged a confirmation to be necessary;

making an inquiry on the presence of updates for said software to said update data supplying apparatus detected by said detecting; and executing a process based on said update confirmation information supplied from said update data supplying apparatus in response to said inquiry.

9. A non-transitory computer readable storage medium encoded with instructions, which when executed by a computer causes the computer to implement an information processing method that executes a process in accordance with update confirmation information supplied from an update data supplying apparatus that supplies via a network said update confirmation information regarding a presence or absence of updates for predetermined software, said method comprising:

deciding and generating update management data indicating a timing for confirming the presence of updates for installed software, wherein the time cycle is determined based on a nature of the installed software;

storing said update management data generated by said generating;

judging based on said update management data whether or not, the presence of updates needs to be confirmed;

detecting said update data supplying apparatus to which an inquiry is to be made on the presence of updates for said software for which said judging has judged a confirmation to be necessary;

making an inquiry on the presence of updates for said software to said update data supplying apparatus detected by said detecting; and executing a process based on said update confirmation information supplied from said update data supplying apparatus in response to said inquiry.

* * * * *